United States Patent
Li et al.

(10) Patent No.: US 9,710,045 B2
(45) Date of Patent: Jul. 18, 2017

(54) MANAGING NETWORK WAKE-UP COMMANDS

(71) Applicant: Quanta Computer Inc., Taoyuan (TW)

(72) Inventors: Yung-Fu Li, Taoyuan (TW); Chin-Fu Tsai, Taoyuan (TW); Kai-Fan Ku, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/883,136

(22) Filed: Oct. 14, 2015

(65) Prior Publication Data
US 2017/0108912 A1   Apr. 20, 2017

(51) Int. Cl.
*G06F 1/32* (2006.01)
*G06F 11/07* (2006.01)
*G06F 9/44* (2006.01)

(52) U.S. Cl.
CPC .......... *G06F 1/3209* (2013.01); *G06F 9/4418* (2013.01); *G06F 11/076* (2013.01)

(58) Field of Classification Search
CPC .............................. G06F 9/4418; G06F 11/076
See application file for complete search history.

(56) References Cited

U.S. PATENT DOCUMENTS

| 2007/0234401 | A1* | 10/2007 | Eldar ...................... H04L 12/12 726/2 |
| 2010/0332870 | A1* | 12/2010 | Chen ..................... G06F 1/3209 713/320 |
| 2013/0073876 | A1* | 3/2013 | Cong ..................... G06F 1/3203 713/300 |

* cited by examiner

*Primary Examiner* — Albert Wang
(74) *Attorney, Agent, or Firm* — Nixon Peabody LLP; Zhou Lu (57) ABSTRACT

A method for managing network wake-up commands by a controller of a server includes receiving a system health data. The method includes receiving a network wake-up command from a network interface controller of the server. The method further includes the determining whether to wake-up the server based on the system health data to yield a determination, and commanding the server to wake-up, when the determination is to wake-up the server.

20 Claims, 5 Drawing Sheets

MANAGING NETWORK WAKE-UP COMMANDS

BACKGROUND

Field

This application relates to networked computer systems, and more particularly to a system and method for managing network wake-up commands.

Background

Reducing the amount of time that network devices are fully powered on can increase device longevity and power conservation. Wake-On-LAN (WOL) is a system that allows network devices, such as servers, computers, and printers, to be accessible in powered off or sleep states. A network device using WOL can be turned on or woken after receiving a WOL command. For example, a requesting network device can broadcast a WOL command, also called a "magic packet", over the data link layer of a network. The magic packet includes the media access control (MAC) address of the target network device to be turned on or woken.

Existing WOL systems may be vulnerable to malicious electronic attacks. For example, a hacker on the same network as a server can send repeated wake-up commands to the server. Computer hardware can be damaged or quickly worn out by repeated power cycling (i.e., turning off and on again) due to various power on and off procedures that must be performed each time. For similar reasons, the standard WOL system can also be vulnerable to unintentional repeated wake-up commands within relatively short periods.

A server with an existing WOL system may also suffer damage from waking-up when the server has current health status conditions. For example, a fan may have malfunctioned or a power supply unit (PSU) may be outputting a voltage outside of acceptable limits. Waking-up the server with such health status conditions may cause further damage to hardware or even data corruption or loss and increase server down-time.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a controller of a server can receive a system health data, and further receive a network wake-up command from a network interface controller of the server. The controller can determine whether to wake-up the server based on the system health data to yield a determination, and command the server to wake-up, when the determination is to wake-up the server.

In some other implementations for managing network wake-up commands, a controller of a server can receive a network wake-up command from a network interface controller of the server and log a wake-up command timestamp into an event log for the network wake-up command. The controller can determine whether to wake-up the server based on the event log to yield a determination, and command the server to wake-up, when the determination is to wake-up the server.

In some implementations, a server can include a network interface controller, a platform controller hub in communication with the network interface controller, and a controller in communication with the network interface controller. The controller can store instructions which, when executed, cause the server to receive a system health data, receive a network wake-up command from the network interface controller, determine whether to wake-up the server based on the system health data to yield a determination, and send a command to the platform controller hub to wake-up the server, when the determination is to wake-up the server.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for managing network wake-up commands. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects.

A network device, such as a server, a desktop computer, or a mobile device, can be put in a powered down, powered off, sleeping, or hibernating state to reduce energy consumption and increase hardware longevity. Wake-up commands can be used to power on or wake-up network devices, such as servers, remotely over a network. For example, Wake-on-LAN (WOL) is an Ethernet-based computer networking protocol used to power on or wake-up network devices through a wake-up packet. Similarly, Wake on Wireless LAN (WoWLAN) can be used to turn on or wake up wireless network devices on Wi-Fi.

Ethernet has been the most widely used networking standard for connecting computers in both Local Area Networks (LANs) and Wide Area Networks (WANs). Ethernet devices can communicate by transmitting data packets, which comprise blocks of data that are individually sent and delivered. Ethernet defines a number of wiring and signaling standards for the physical layer (PHY), through means of network access at the Data Link Layer, and through a common addressing format.

The wake-up packet, sometimes called "magic packet", can broadcasted by another network device on the same LAN, to all connected network devices on a given network. The magic packet can include the MAC address of a target network device. The MAC address is an identifying number built into each network interface controller (NIC) or other network device that enables it to be uniquely recognized and addressed on a network. Powered down or turned off servers capable of WOL can use devices able to listen to incoming packets in a low-power mode while the server is powered down or turned off. If a magic packet is received that is directed to a server's MAC address, the NIC of the server can signal the server's power supply or motherboard to initiate system wake-up, similar to the physical press of a power button.

The magic packet can be sent on the data link layer, which is layer 2 in the Open Systems Interconnection (OSI) model. The magic packet can be broadcasted using a network broadcast address, while the IP-address (layer 3 in the OSI model) is not used. The magic packet can be a broadcast frame containing six bytes, each having a value of 255, followed by sixteen repetitions of the target network device's 48-bit MAC address. Standard magic packets do not provide delivery confirmation and require the destination server to support WOL.

WOL support can implemented on the motherboard (e.g., in the BIOS) of a computer and can operate independent of an operating system. However, some operating systems can control WOL using hardware drivers. The network card of a network device configured to work in a WOL system may receive power even if the network device is in a power-off or sleep state.

Figure 1:
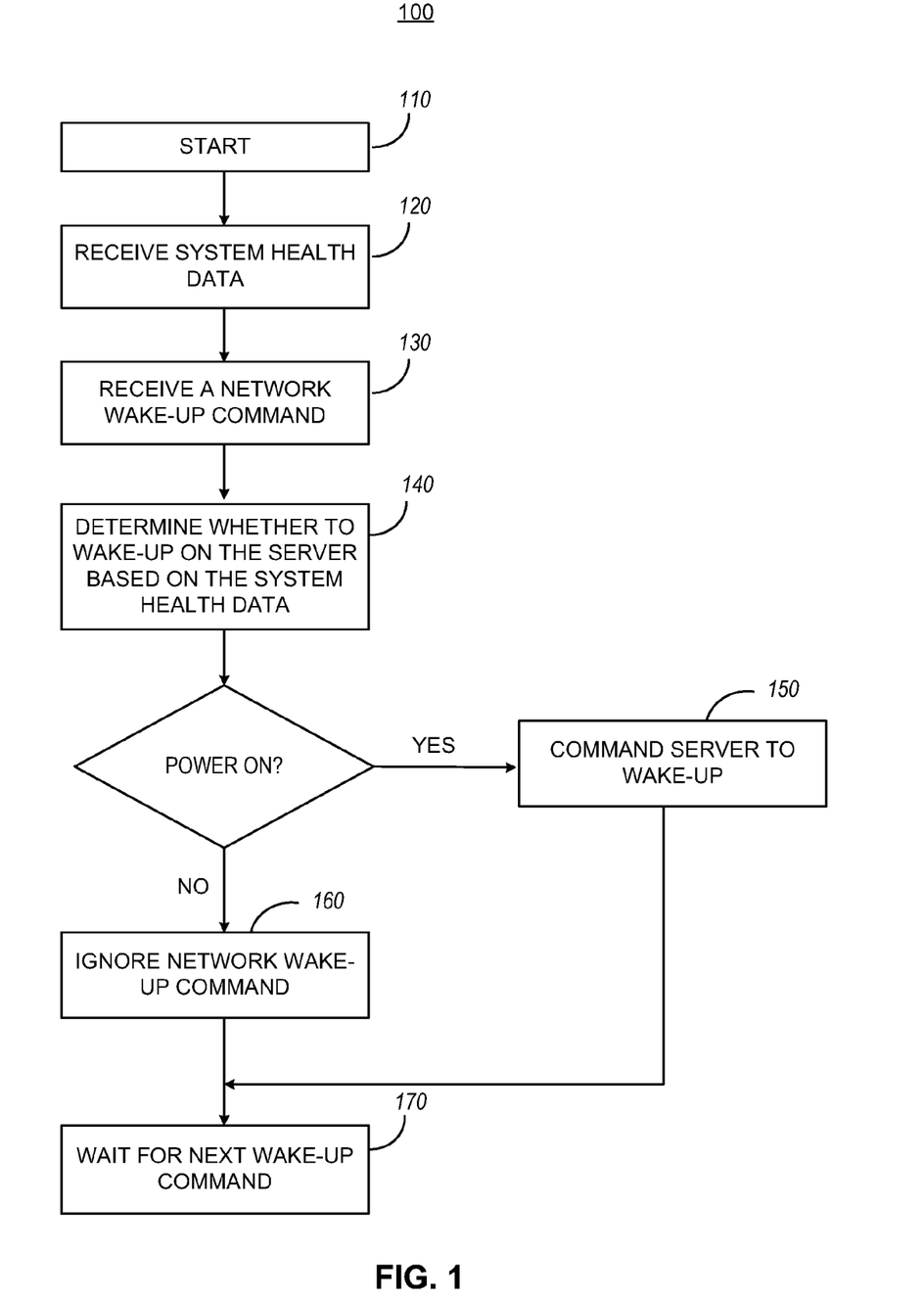
FIG. 1 illustrates an example flow chart for managing network wake-up commands.

FIG. 1 illustrates an example flow chart 100 for managing network wake-up commands. Starting from step 110, a network device, such as a server, a desktop computer, or a mobile device, can be in a powered off, powered down, sleeping, or hibernating state.

Sleep mode (also known as "stand by" or "suspend") is a low power mode for computers. A computer saves its machine state in random access memory (RAM), cuts power to unneeded subsystems, and places the memory into a minimum power state, just sufficient to retain the memory's data. Many computers automatically enter this mode when idle for a certain period of time. A computer must consume some energy while sleeping in order to power the RAM and to be able to respond to a wake-up event. In addition to a wake-up press of the power button, sleeping computers can also respond to other wake cues, such as from a keyboard or a mouse. The sleep mode can significantly reduce power consumption compared to leaving a device at full power, and allow a user upon wake-up to avoid reissuing instructions or waiting for the computer to boot from a powered off mode.

Hibernation mode, unlike sleep mode, saves the contents of its RAM to a hard disk drive (HDD) or other non-volatile storage. Upon resumption, the computer is exactly as it was before entering hibernation. Hibernation mode can conserve even more power than sleep mode because non-volatile storage does not require power to maintain the ability to store data.

At step 120, a controller (e.g., a baseboard management controller) of the server can receive system health data. For example, the system health data can include processor temperatures, motherboard temperature, memory temperature, vibration data, hard drive status, voltage and current levels, PSU status, fan status, abnormal packets in a network, and/or various other system health indicators.

At step 130, the controller can receive a network wake-up command from a NIC of the server. In some implementations, the controller can receive the network wake-up command from the NIC of the server from a network. For example, the NIC can include a LAN chip configured to receive the network wake-up command from a LAN. For example the network can be any wired or wireless LANs or WANs, such as Ethernet, Fibre Channel, Wi-Fi, Bluetooth, Firewire, the Internet, etc. For example, the wake-up command can be in the form of a wake-up packet or magic packet from the WOL protocol. The network wake-up command can specifically identify the server for waking-up.

In some implementations, the controller can log the network wake-up command with a timestamp of when the network wake-up command is received. For example, the log can be saved in a storage accessible by the controller.

In some implementations, the controller can filter the network wake-up command based on a number of times the server has been woke-up within a time period. For example, the controller can ignore a new network wake-up command if the server has been woke-up two times in the past five minutes.

In some implementations, the controller can filter the network wake-up command based on a number of times the network wake-up command has been received within a time period. For example, the controller can ignore a new network wake-up command if the network wake-up command has been received one time in the past one minute.

In some implementations, the controller can filter the network wake-up command based on a time interval between receiving consecutive network wake-up commands. For example, the controller can ignore a new network wake-up command if a prior network wake-up command has been received in the past two minutes.

At step 140, the controller can determine whether to wake-up the server based on the system health data. In some implementations, the controller can analyze the system health data to determine whether waking-up will cause damage to hardware components or data corruption or loss. For example, an elevated temperature of a processor, motherboard, memory or other server component can yield a determination to not wake-up the server. A malfunctioning fan or PSU can yield a determination not to wake-up the server. Voltage or current levels outside a safe threshold can also yield a determination not to wake-up the server. The controller can also determine not to wake-up the server if the system health data indicates an abnormal packet in the network. The controller can determine not to wake-up the server if the system health data indicates that a boot HDD is missing.

In some implementations, if the system health data indicates that no damage will be caused to the hardware components and no data will be corrupted or lost, the controller can yield a determination to wake-up the server.

In some implementations, the controller can log the wake-up determination with a timestamp, in response to determining to wake-up the server. For example, the log can be saved in a storage accessible by the controller.

At step 150, the controller commands the server to wake-up, when the determination is to wake-up the server. In some implementations, the command can include sending a power command to a platform controller hub (PCH) of the server. The PCH is a microchip that can power on the server from a power off mode or wake the server from a sleep or hibernation mode.

At step 160, the controller can ignore the network wake-up command, when the determination is to not wake-up the server.

At step 170, the server can wait for a next network wake-up command.

Figure 2:
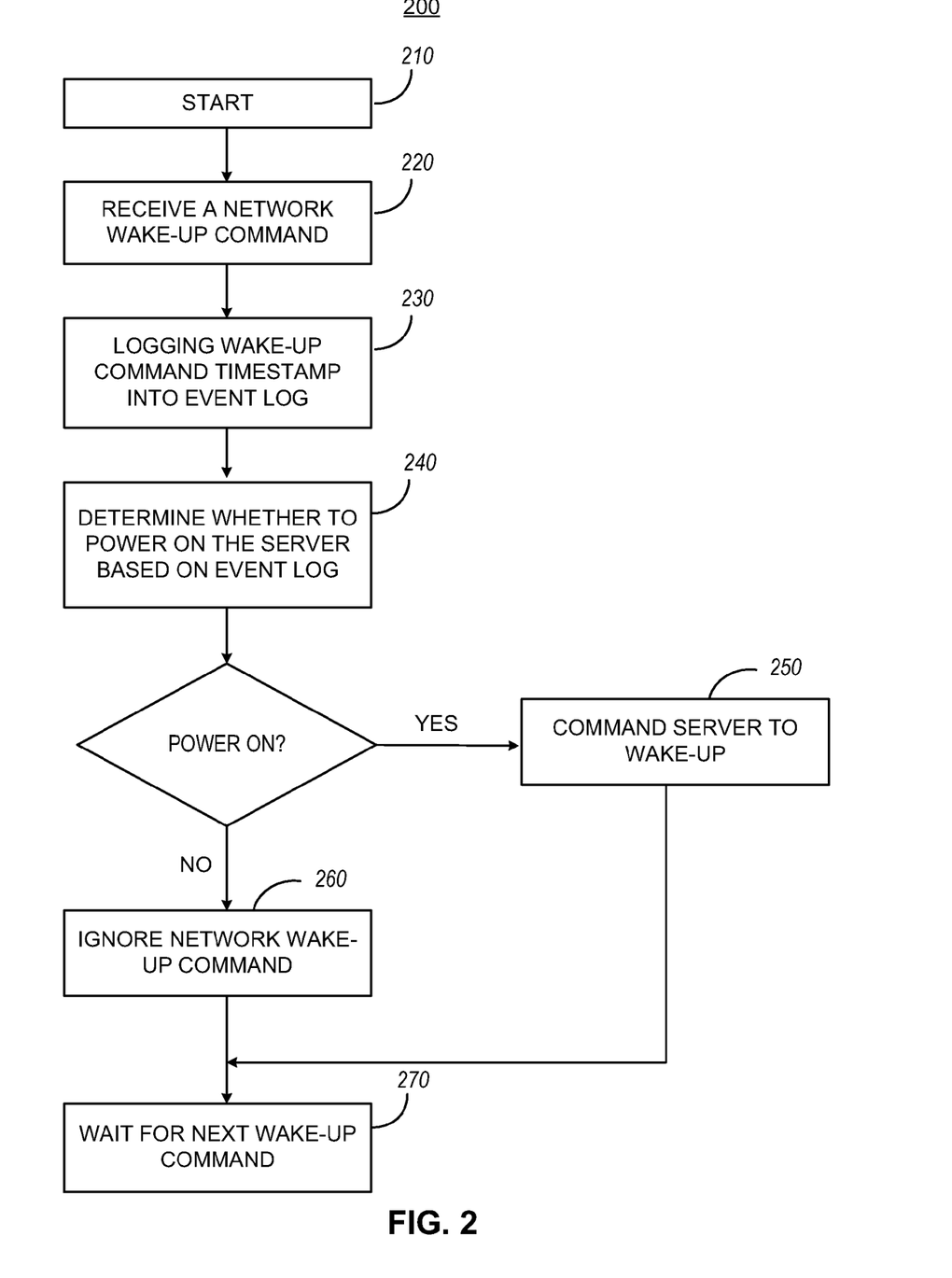
FIG. 2 illustrates a second example flow chart for managing network wake-up commands.

FIG. 2 illustrates a second example flow chart for managing network wake-up commands. Starting from step 210, a network device, such as a server, a desktop computer, or a mobile device, can be in a powered down, powered off, sleeping, or hibernating state.

At step 220, the controller can receive a network wake-up command from a NIC of the server. In some implementations, the controller can receive the network wake-up command from the NIC of the server from a network. For example, the NIC can include a LAN chip configured to receive the network wake-up command from a LAN.

For example the network can be any wired or wireless LANs or WANs, such as Ethernet, Fibre Channel, Wi-Fi, Bluetooth, Firewire, the Internet, etc. For example, the wake-up command can be in the form of a wake-up packet or magic packet from the WOL protocol. The network wake-up command can specifically identify the server for waking-up.

At step 230, the controller can log the network wake-up command in an event log with a timestamp of when the network wake-up command is received. For example, the log can be saved in a storage accessible by the controller.

At step 240, the controller can determine whether to wake-up the server based on the event log. In some implementations, the controller can determine to wake-up the server, if the event log shows that the network wake-up command has been received from the NIC less than a threshold number of times within a time period. For example, the controller is not allowed to wake-up the server if the server has been woke-up two times in the past five minutes.

In some implementations, the controller can determine a number of times the server has been powered on within a time period, where the determination to wake-up the server is based at least in part on the number of times being less than a threshold. In some implementations, the controller can log the wake-up determination with a timestamp, in response to determining to wake-up the server. The log can be saved in a storage accessible by the controller. For example, the controller can determine to wake-up the server if the server has been woken-up less than three times in the past fifteen minutes.

In some implementations, the controller can determine to wake-up the server, if the event log shows a time interval between receiving consecutive network wake-up commands to be more than a threshold interval. For example, the controller can determine to wake-up the server if a prior network wake-up command has not been received in the past two minutes.

At step 250, the controller commands the server to wake-up, when the determination is to wake-up the server. In some implementations, the command can include sending a power command to a PCH of the server.

At step 260, the controller can ignore the network wake-up command, when the determination is to not wake-up the server.

At step 270, the server can wait for a next network wake-up command.

Figure 3:
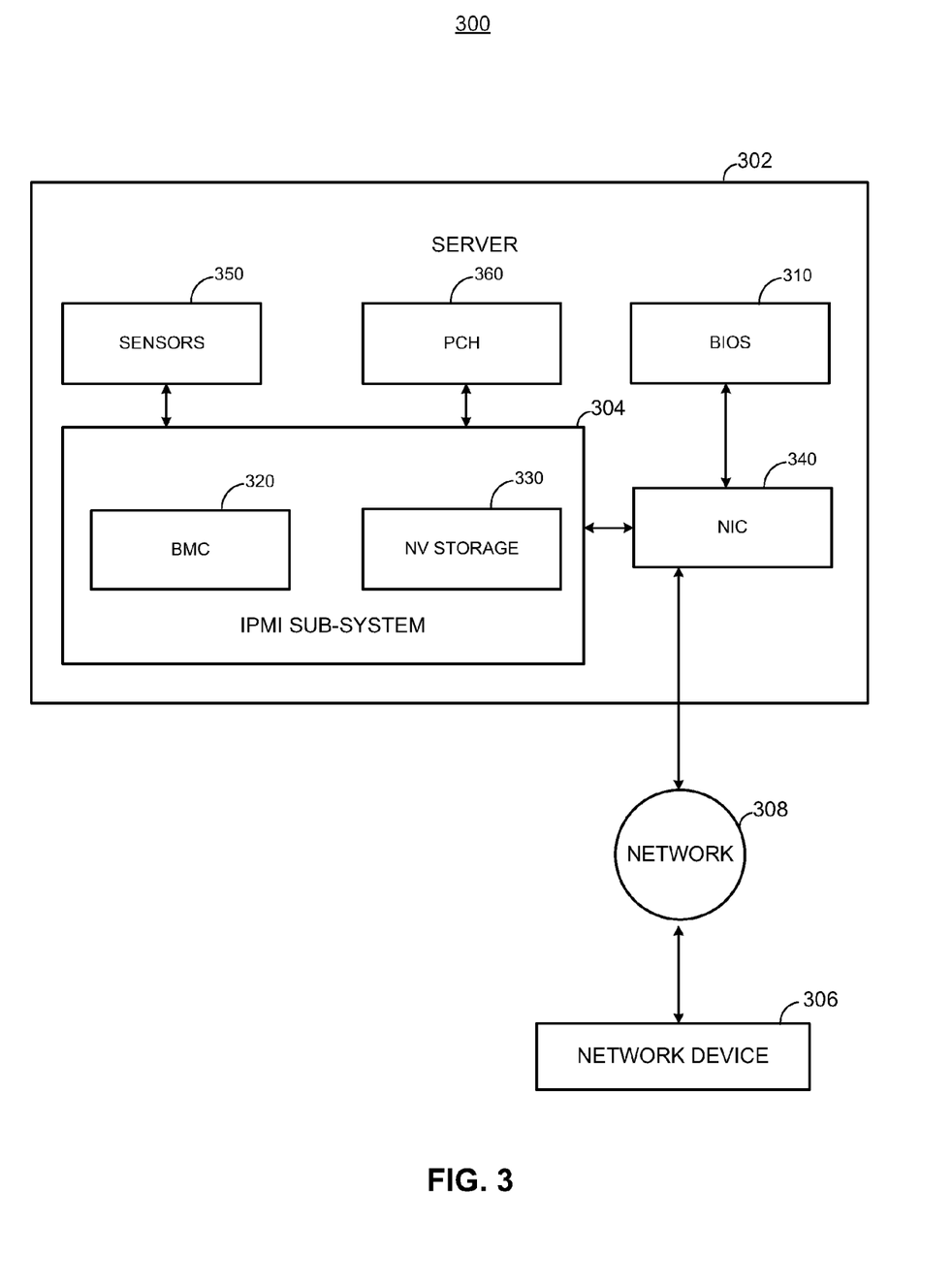
FIG. 3 illustrates a block diagram of an example server for managing network wake-up commands.

FIG. 3 illustrates a block diagram of an example server for managing network wake-up commands. The server 302 can include a BIOS 310, NIC 340, sensors 350, and an IPMI sub-system 304.

The IPMI sub-system can include a baseboard management controller (BMC) 320, a non-volatile storage 330, and other management controllers (not shown) distributed among different system modules that are referred to as satellite controllers. The satellite controllers within the same chassis connect to the BMC via Intelligent Platform Management Bus (IPMB), an implementation of Inter-Integrated Circuit (IIC or I²C) protocol. The IIC protocol features a multi-master, multi-slave, single-ended, serial computer bus that uses a Serial Data Line and a Serial Clock Line with a 7-bit or a 10-bit address space.

The BMC 320 can include a microcontroller that manages interfaces between system management software and platform hardware. In some implementations, each BMC 320 can manage hardware components within the server 302, such as processors, memory, storage devices, PSUs, fans, boards, etc.

In some implementations, the BMC 320 can communicate with the various server components that the BMC 320 manages using the IPMI protocol. IPMI is a set of specifications for an autonomous computer subsystem that manages and monitors a computer system's CPU, firmware, and operating system, and for out-of-band management and monitoring by system administrators. The BMC 320 can connect to the various server components (e.g., NIC 340) using any bus interface such as the system management bus (SMBus), RS-232 serial bus, IIC protocol, Ethernet, IPMB, low-pin count (LPC) bus, etc. The IIC protocol features a multi-master, multi-slave, single-ended, serial computer bus that uses a Serial Data Line and a Serial Clock Line with a 7-bit or a 10-bit address space. The SMBus protocol features a single-ended, two-wire bus derived from IIC protocol and uses IIC hardware and IIC addressing. The IPMB is an IIC based serial bus for connecting various boards within the server.

The IPMI sub-system 304 can include a non-volatile storage 330 for storing information, which can include a System Event Log (SEL), a Sensor Data Record (SDR) Repository, and Field Replaceable Units (FRUs).

The server 302 can first be in a powered off, powered down, sleeping, or hibernating state. The BMC 320 of the server 302 can then receive system health data. For example, the system health data can include processor temperatures, motherboard temperature, memory temperature, vibration data, hard drive status, voltage and current levels, PSU status, fan status, abnormal packets in the network 308, and/or various other system health indicators from the sensors 350. For example, the sensors 350 can include temperature, voltage, current, vibration, and/or other health status sensors.

The BMC 320 can receive a network wake-up command from the NIC 340 of the server 302. In some implementations, the BMC 320 can receive the network wake-up command from the NIC 340 of the server 302 from a network 308. For example, the NIC 340 can include a LAN chip configured to receive the network wake-up command from a LAN.

The network wake-up command can be received from a network device 306. The BMC 320 can connect to a network 308 using the NIC 340. The NIC 340 of the server 302 can include computer hardware components that allow a computing device to communicate over the network 308. The NIC 340 can connect to the network device 306 through the network 308. The network 308 can be, for example, a local area network (LAN) such as Ethernet, Wi-Fi, or Bluetooth, or a wide area network such as the Internet.

The network 308 can be a telecommunications network that allows network nodes to exchange data along network links. For example, the network 308 can be an Ethernet, a type of wired LAN protocol described by a set of standards together called IEEE 802.3.

For example, the wake-up command can be in the form of a wake-up packet or magic packet from the WOL protocol. The network wake-up command can specifically identify the server 302 for waking-up.

In some implementations, the BMC 320 can log the network wake-up command with a timestamp of when the network wake-up command is received. For example, the log can be saved in the NV storage 330 accessible by the BMC 320.

In some implementations, the BMC 320 can filter the network wake-up command based on a number of times the server 302 has been woke-up within a time period. In some implementations, the BMC 320 can filter the network wake-up command based on a number of times the network wake-up command has been received within a time period. In some implementations, the BMC 320 can filter the network wake-up command based on a time interval between receiving consecutive network wake-up commands.

After receiving the network wake-up command, the BMC 320 can determine whether to wake-up the server 302 based on the system health data. In some implementations, the BMC 320 can analyze the system health data to determine whether waking-up will cause damage to hardware components or data corruption or loss.

In some implementations, if the system health data indicates that no damage will be caused to the hardware components and no data will be corrupted or lost, the BMC 320 can yield a determination to wake-up the server 302.

In some implementations, the BMC 320 can log the wake-up determination with a timestamp, in response to determining to wake-up the server 302. For example, the log can be saved in the NV storage 330 accessible by the BMC 320.

The BMC 320 can command the server 302 to wake-up, when the determination is to wake-up the server 302. In some implementations, the command can include sending a power command to a PCH 360 of the server 302. The PCH 360 is a microchip that can power on the server 302 from a power off mode or wake the server 302 from a sleep or hibernation mode. The BMC 320 can ignore the network wake-up command, when the determination is to not wake-up the server 302.

Figure 4:
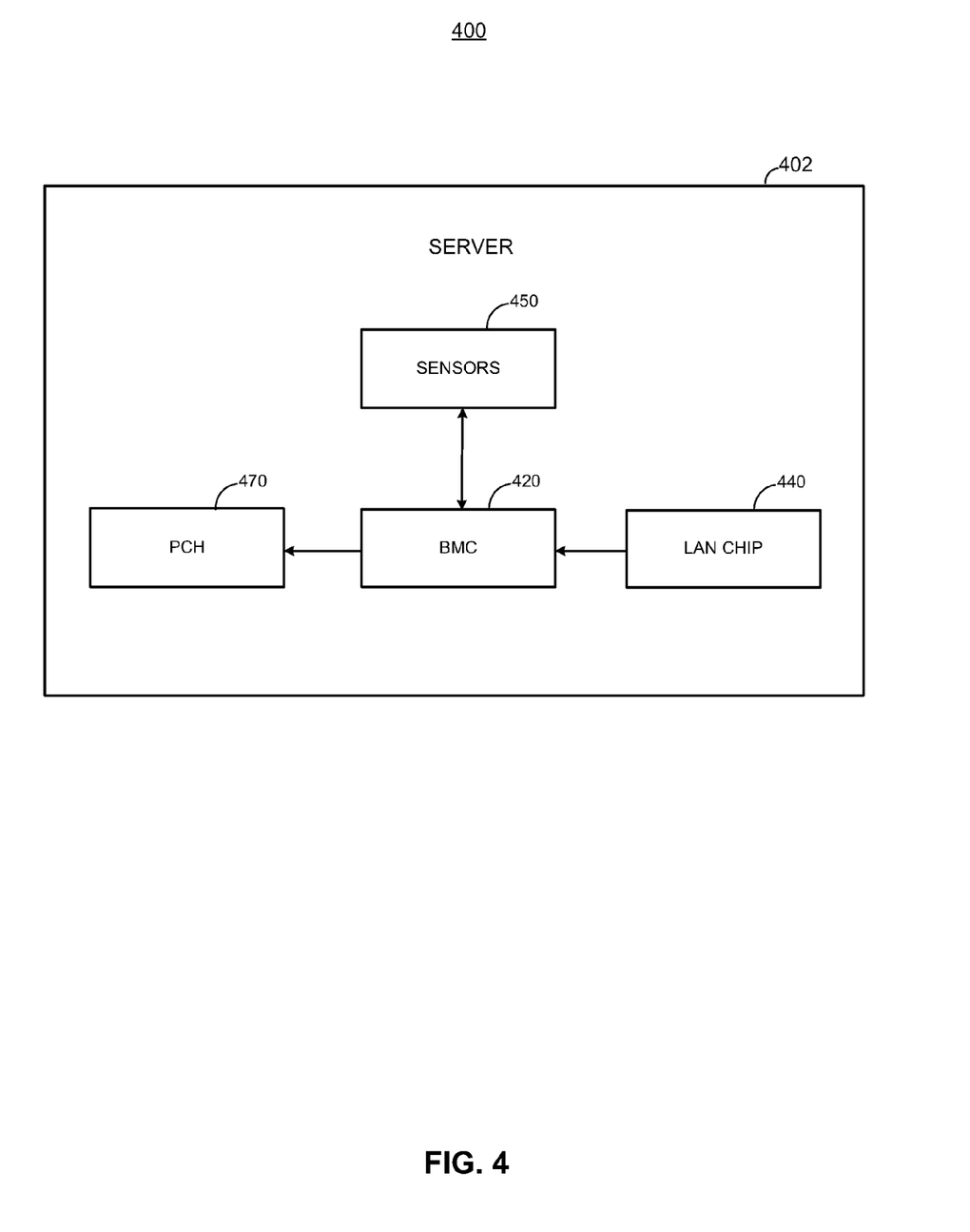
FIG. 4 illustrates a block diagram of another example server for managing network wake-up commands.

FIG. 4 illustrates a block diagram of another example server for managing network wake-up commands. The server 402 can include a LAN chip 440, sensors 450, a BMC 420, and a PCH 470. The LAN chip 440 of the server 402 can receive a wake-up command such as a WOL command and forward the wake-up command to the BMC 420. The BMC 420 can communicate with the sensors 450 to receive system health data. The BMC 420 can determine whether to wake-up the server 402 based at least in part on the system health data from the sensors 450. If the BMC 420 determines to wake-up the server 402, the BMC 420 can send a command to the PCH 470 to power on the server 402.

Figure 5:
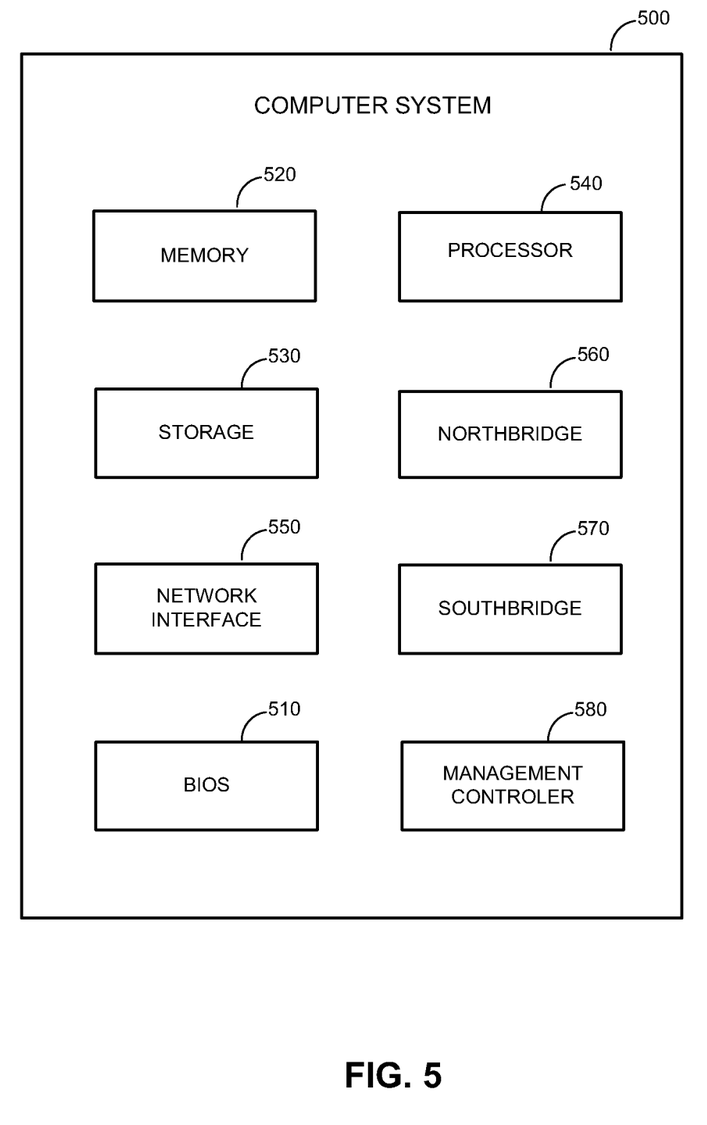
FIG. 5 illustrates a block diagram of an example computer system.

FIG. 5 illustrates a block diagram of an example computer system 500. The computer system 500 can include a processor 540, a network interface 550, a management controller 580, a memory 520, a storage 530, a BIOS 510, a northbridge 560, and a southbridge 570.

The computer system 500 can be, for example, a server (e.g., a server in a server rack of a data center) or a personal computer. The processor (e.g., central processing unit (CPU)) 540 can be a chip on a motherboard that can retrieve and execute programming instructions stored in the memory 520. The processor 540 can be a single CPU with a single processing core, a single CPU with multiple processing cores, or multiple CPUs. One or more buses (not shown) can transmit instructions and application data between various computer components such as the processor 540, memory 520, storage 530, and networking interface 550.

The memory 520 can include any physical device used to temporarily or permanently store data or programs, such as various forms of random-access memory (RAM). The storage 530 can include any physical device for non-volatile data storage such as a HDD or a flash drive. The storage 530 can have a greater capacity than the memory 520 and can be more economical per unit of storage, but can also have slower transfer rates.

The BIOS 510 can include a Basic Input/Output System or its successors or equivalents, such as an Extensible Firmware Interface (EFI) or Unified Extensible Firmware Interface (UEFI). The BIOS 510 can include a BIOS chip located on a motherboard of the computer system 500 storing a BIOS software program. The BIOS 510 can store firmware executed when the computer system is first powered on along with a set of configurations specified for the BIOS 510. The BIOS firmware and BIOS configurations can be stored in a non-volatile memory (e.g., NVRAM) or a ROM such as flash memory. Flash memory is a non-volatile computer storage medium that can be electronically erased and reprogrammed.

The BIOS 510 can be loaded and executed as a sequence program each time the computer system 500 is started. The BIOS 510 can recognize, initialize, and test hardware present in a given computing system based on the set of configurations. The BIOS 510 can perform self-test, such as a Power-on-Self-Test (POST), on the computer system 500. This self-test can test functionality of various hardware components such as hard disk drives, optical reading devices, cooling devices, memory modules, expansion cards and the like. The BIOS can address and allocate an area in the memory 520 in to store an operating system. The BIOS 510 can then give control of the computer system to the OS.

The BIOS 510 of the computer system 500 can include a BIOS configuration that defines how the BIOS 510 controls various hardware components in the computer system 500. The BIOS configuration can determine the order in which the various hardware components in the computer system 500 are started. The BIOS 510 can provide an interface (e.g., BIOS setup utility) that allows a variety of different parameters to be set, which can be different from parameters in a BIOS default configuration. For example, a user (e.g., an administrator) can use the BIOS 510 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 580 can be a specialized microcontroller embedded on the motherboard of the computer system. For example, the management controller 580 can be a baseboard management controller (BMC). The management controller 580 can manage the interface between system management software and platform hardware. Different types of sensors built into the computer system can report to the management controller 580 on parameters such as temperature, cooling fan speeds, power status, operating system status, etc. The management controller 580 can monitor the sensors and have the ability to send alerts to an administrator via the network interface 550 if any of the parameters do not stay within preset limits, indicating a potential failure of the system. The administrator can also remotely communicate with the management controller 580 to take some corrective action such as resetting or power cycling the system to restore functionality.

The northbridge 560 can be a chip on the motherboard that can be directly connected to the processor 540 or can be integrated into the processor 540. In some instances, the northbridge 560 and the southbridge 570 can be combined into a single die. The northbridge 560 and the southbridge 570, manage communications between the processor 540 and other parts of the motherboard. The northbridge 560 can manage tasks that require higher performance than the southbridge 570. The northbridge 560 can manage communications between the processor 540, the memory 520, and video controllers (not shown). In some instances, the northbridge 560 can include a video controller.

The southbridge 570 can be a chip on the motherboard connected to the northbridge 560, but unlike the northbridge 560, need not be directly connected to the processor 540. The southbridge 570 can manage input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 500. The southbridge 570 can connect to or can include within the southbridge 570 the management controller 570, Direct Memory Access (DMAs) controllers, Programmable Interrupt Controllers (PICs), and a real-time clock. In some instances, the southbridge 570 can directly connect to the processor 540, such as in the case where the northbridge 560 is integrated into the processor 540.

The networking interface 450 can be any interface that supports wired or wireless Local Area Networks (LANs) or Wide Area Networks (WANs), such as Ethernet, Fibre Channel, Wi-Fi, Bluetooth, Firewire, the Internet, etc. For example, the networking interface 40 can include a network interface controller (NIC) for Ethernet. Ethernet has been the most widely used networking standard for connecting computers in both Local Area Networks (LANs) and Wide Area Networks (WANs). Ethernet defines a number of wiring and signaling standards for the physical layer (PHY), through means of network access at the Media Access Control (MAC)/Data Link Layer, and through a common addressing format. Ethernet enabled devices typically communicate by transmitting data packets, which comprise blocks of data that are individually sent and delivered.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method of managing network wake-up commands, comprising:
   receiving, at a controller of a server, a system health data;
   receiving, at the controller, a network wake-up command from a network interface controller of the server;
   filtering, at the controller, the network wake-up command based on a number of times the server has been woke-up within a time period;
   determining, by the controller, whether to wake-up the server based on the system health data to yield a determination; and
   commanding, by the controller, the server to wake-up, when the determination is to wake-up the server.

2. The method of claim 1, further comprising filtering, at the controller, the network wake-up command based on a number of times the network wake-up command is received from the network interface controller within a time period.

3. The method of claim 1, further comprising disabling, by the controller, a port of the network interface controller based on a number of times the network wake-up command is received from the network interface controller within a time period.

4. The method of claim 1, further comprising filtering, at the controller, the network wake-up command based on a time interval between receiving consecutive network wake-up commands.

5. The method of claim 1, wherein the commanding comprises the controller sending a power command to a platform controller hub of the server.

6. The method of claim 1, wherein the network interface controller includes a local area network chip configured to receive the network wake-up command from a local area network.

7. The method of claim 1, wherein the controller determines not to wake-up the server, if the system health data indicates no boot drive.

8. The method of claim 1, wherein the controller determines not to wake-up the server, if the system health data indicates a fan malfunction.

9. The method of claim 1, wherein the determination is to not wake-up the server, when the system health data indicates an abnormal packet in a local area network.

10. The method of claim 1, further comprising logging a wake-up command timestamp for the network wake-up command.

11. The method of claim 1, further comprising logging a wake-up determination timestamp, in response to determining to wake-up the server.

12. A method of managing network wake-up commands, comprising:
    receiving, at a controller of a server, a network wake-up command from a network interface controller of the server;
    logging a wake-up command timestamp into an event log for the network wake-up command;
    determining, by the controller, whether to wake-up the server based on the event log to yield a determination; and
    commanding, by the controller, the server to wake-up, when the determination is to wake-up the server.

13. The method of claim 12, wherein the controller determines to wake-up the server, if the event log shows that the network wake-up command has been received from the network interface controller less than a threshold number of times within a time period.

14. The method of claim 12, further comprising determining a number of times the server has been woke-up within a time period, wherein the determination to wake-up the server is based at least in part on the number of times being less than a threshold.

15. The method of claim 12, wherein the controller determines to wake-up the server, if the event log showing a time interval between receiving consecutive network wake-up commands to be more than a threshold interval.

16. The method of claim 12, wherein the commanding comprises the controller sending a power command to a platform controller hub of the server.

17. The method of claim 12, wherein the network interface controller includes a local area network chip configured to receive the network wake-up command from a local area network.

18. The method of claim 12, further comprising logging a wake-up determination timestamp, in response to determining to wake-up the server.

19. A server, comprising:
    a network interface controller;
    a platform controller hub; and
    a controller, in communication with the network interface controller and the network controller hub, and storing instructions which, when executed, cause the server to perform operations comprising:
        receiving a system health data;
        receiving a network wake-up command from the network interface controller;
        filtering the network wake-up command based on a number of times the server has been woke-up within a time period;
        determining whether to wake-up the server based on the system health data to yield a determination; and
        sending a command to the platform controller hub to wake-up the server, when the determination is to wake-up the server.

20. The server of claim 19, wherein the network interface controller includes a local area network chip configured to receive the network wake-up command from a local area network.

* * * * *